J. F. FOSTER.
ROLLER BEARING.
APPLICATION FILED NOV. 28, 1910.

1,049,471. Patented Jan. 7, 1913.

Witnesses
Frank R Glue
M. K. Preston

Inventor
J. F. Foster
By George H Thorpe Atty.

UNITED STATES PATENT OFFICE.

JOHN F. FOSTER, OF KANSAS CITY, KANSAS.

ROLLER-BEARING.

1,049,471.  Specification of Letters Patent.  Patented Jan. 7, 1913.

Application filed November 28, 1910. Serial No. 594,596.

*To all whom it may concern:*

Be it known that I, JOHN F. FOSTER, a citizen of the United States, residing at Kansas City, in the county of Wyandotte and State of Kansas, have invented certain new and useful Improvements in Roller-Bearings, of which the following is a specification.

This invention relates to roller bearings, and more especially to bearings embodying conical rollers arranged circularly and in a converging relation, and my object is to produce a roller bearing embodying resiliency as its characteristic feature so that it will yield under the imposition of a strain sufficient to crush a roller, and distribute such strain on two or more rollers.

With this general object in view, the invention consists in certain novel and peculiar features of construction and combinations of parts as hereinafter described and claimed; and in order that it may be fully understood reference is to be had to the accompanying drawing, in which:—

Figure 1:
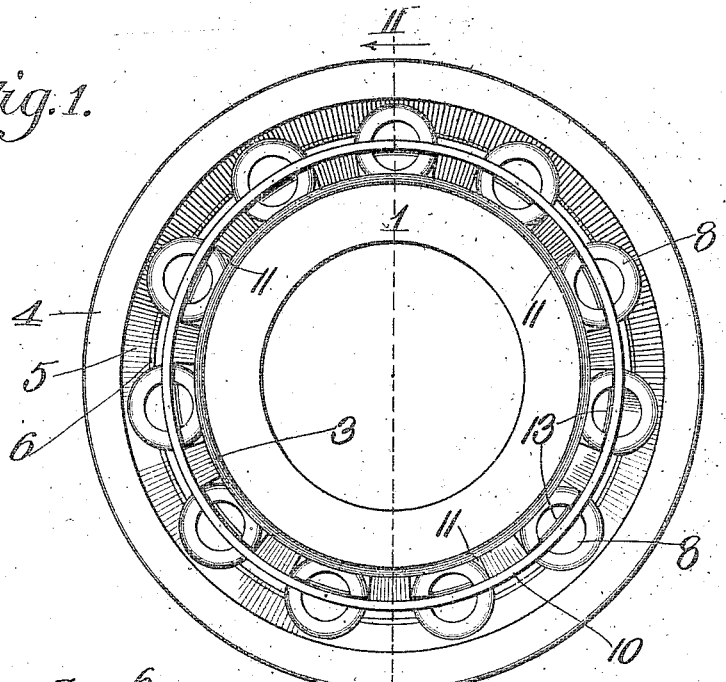
Figure 2:
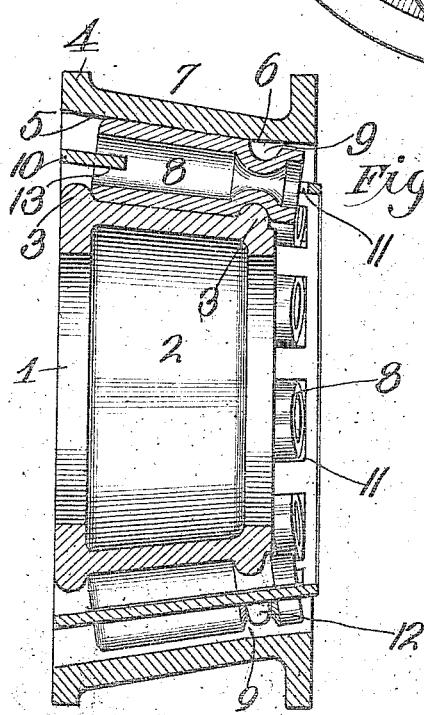
Figure 3:
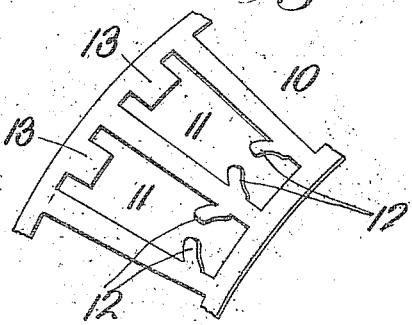

Figure 1, is an end view of a bearing embodying my invention. Fig. 2, is a section on the line II—II of Fig. 1. Fig. 3, is a fragmentary perspective view of a cage forming a part of the invention.

In the said drawing, 1 is a conical bearing sleeve to be mounted on a shaft (not shown), provided with an internal circular channel 2, and an external circular rib 3, the preferred construction embodying a pair of such ribs, one located near each end of the sleeve. The sleeve is preferably made of resilient material and secured to the shaft in such a manner that it may flex slightly under certain conditions. A circular collar 4, surrounds the conical sleeve and is of tapering form internally, the tapering inner face 5, extending for the greater of the width of the collar and bearing a converging relation with respect to said sleeve, and near the reduced end of the latter, the angle of said tapering face is lessened as at 6. The collar 4, is preferably of resilient material, and if so is preferably reduced in thickness for the greater part of its width by the provision of an external groove 7, this reduction in thickness permitting the collar under certain conditions to spring or flex for a reason hereinafter mentioned, and said collar if made flexible as described, is adapted to be so supported or carried by means not shown, that it shall be capable of flexing under certain conditions.

A series of conical rollers 8 tapered to conform to and fit squarely against the tapered outer surface of the sleeve 1 and the tapered inner face 5 of collar 4, and also of such diameter as to fit snugly between said sleeve and collar, are interposed between said parts and hold them in a concentric relation. These rollers are preferably hollow so as to be capable of flexing slightly under a crushing strain, and thus distributing such strain on a large number of the rollers to avoid chance of injury to one of them. Each roller is provided near its small or reduced end with an annular groove 9, and outward of such groove the roller is of reduced diameter for the purpose of accommodating automatic endwise adjustment or creepage of the collar toward the large ends of the rollers, this adjustment taking up the wear on the rollers and said collar, it being obvious that each roller has a slight endwise movement with respect to the sleeve, to provide for an equitable distribution of strain on the rollers in the event they are of unequal size. The external rib 3 of the sleeve, engages the grooves 9 of the rollers, with sufficient snugness to guard against any possibility of dislocation or disarrangement of the rollers. In the event that each roller is provided with a single groove 8, as shown, only one rib 3 of the conical sleeve, will engage such groove. A circular cage 10 of conical or tapering form, is arranged concentrically between the sleeve and collar and is provided with openings 11 spaced a uniform distance apart and receiving the said rollers, and projecting outward from the cage at opposite sides of each opening 11 thereof, are lugs 12, which engage the grooves 9 of the interposed rollers to maintain them against lateral displacement, that is to say, the lugs of the cage serve to maintain the rollers at equal distances apart around the sleeve and to hold the cage in concentric relation to the sleeve and collar, and in this connection it is to be understood that in my preferred construction, the lugs mentioned will be resilient, not only for the purpose of flexibility, but in order that they may be sprung apart to permit the rollers to be fitted down into the openings of the cage from the outer side thereof. In practice the cage will first be arranged around the sleeve, so that when the rollers are slipped into the openings of the cage, the rib 3, of the sleeve will engage the grooves 9 of the rollers. The collar is then slipped over the rollers, and the proportion of the parts is such that the line of junction of the beveled faces 5 and 6 coincides with or occupies the same vertical plane as the inner ends of the body portions of the rollers, so that the collar as it wears may travel endwise in the direction of the enlarged ends of the rollers, the wear on the collar increasing the area of surface 5, and diminishing the area of surface 6. The provision of taper 6 avoids any possibility of the rollers wearing a channel in the collar and thereby permits the same to automatically move endwise as explained, to take up wear. To resist end thrust, the outer rib 3, of the sleeve, overlaps the outer ends of the rollers, and twisting movement of said ends of the rollers, is prevented by centering tongues 13, projecting into the outer ends of the rollers, from the cage at the outer ends of the opening 11 thereof.

From the above description it will be apparent that I have produced a roller bearing of simple, durable and inexpensive construction, and which may be modified in minor particulars without departing from the principle of construction as defined by the appended claim.

I claim:—

A roller bearing, comprising a conical sleeve provided with an external circumferential rib, a collar surrounding said sleeve and internally tapered toward and converging with respect to the smaller end of the sleeve, hollow conical rollers interposed between said sleeve and collar and each provided with an external circumferential groove receiving the rib of said sleeve, and a circular cage fitting between the sleeve and collar, provided with openings receiving said rollers, outwardly projecting spring tongues or lugs at opposite sides of said openings and engaging the grooves of the rollers in said openings, and tongues projecting into said openings at an end thereof and into the adjacent ends of said hollow rollers.

In testimony whereof I affix my signature, in the presence of two witnesses.

JOHN F. FOSTER.

Witnesses:
 HELEN C. RODGERS,
 G. Y. THORPE.